UNITED STATES PATENT OFFICE.

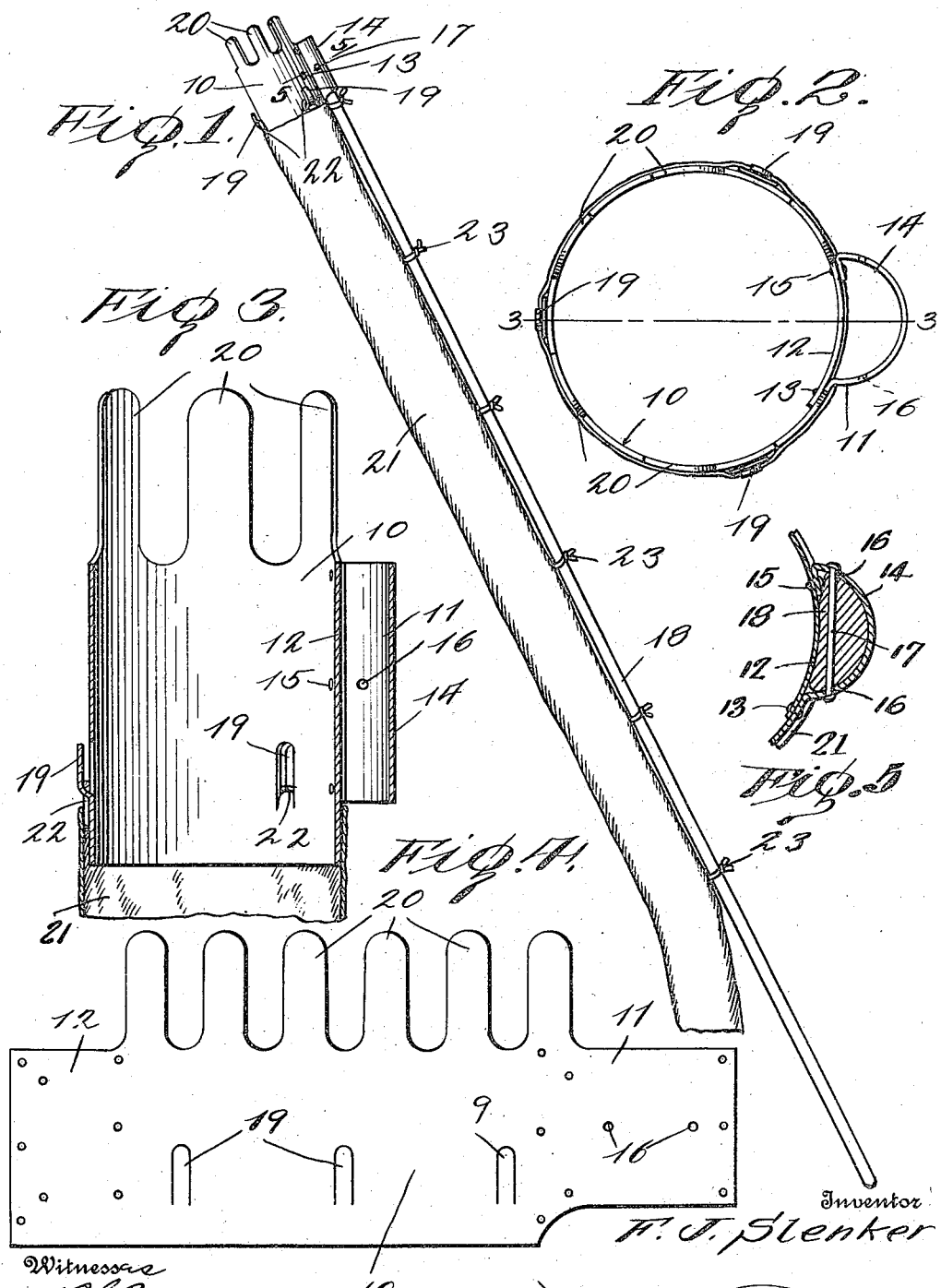

FRED J. SLENKER, OF SPRINGFIELD, ILLINOIS.

FRUIT-PICKER.

1,242,059.　　　　　Specification of Letters Patent.　　　Patented Oct. 2, 1917.

Application filed October 16, 1916. Serial No. 125,915.

*To all whom it may concern:*

Be it known that I, FRED J. SLENKER, a citizen of the United States, residing at Springfield, in the county of Sangamon, State of Illinois, have invented certain new and useful Improvements in Fruit-Pickers; and I do hereby declare the following to be a full, clear, and exact description of the invention, such as will enable others skilled in the art to which it appertains to make and use the same.

This invention relates to fruit pickers and has special reference to a fruit picker designed to pick fruit one at a time and conduct them down a flexible chute to the ground or a convenient receptacle.

One important object of the invention is the provision of a picker wherein the top piece or crown is made of a single blank of sheet material of novel and improved construction.

A second important object of the invention is the provision of a fruit picker of novel construction wherein the chute is detachable from the crown and the pole is also detachable both from the crown and chute these parts being held together when in use.

With the above and other objects in view, as will be apparent the invention consists in general of certain novel details of construction and combinations of parts hereinafter fully described, illustrated in the accompanying drawing, and specifically claimed.

In the accompanying drawing, like characters of reference indicate like parts in the several views, and:—

Figure 1 is a side elevation of the device.

Fig. 2 is a top view thereof.

Fig. 3 is a detail section on the line 3—3 of Fig. 2.

Fig. 4 is a view showing the blank for the crown before it is bent and folded into shape.

Fig. 5 is a sectional view on the line 5—5 of Fig. 1.

In the embodiment of the invention herein illustrated there is provided a blank of sheet metal having a body portion 10 which, in the process of manufacture, is bent into substantially cylindrical form with one end 11 overlapping the other end 12. The overlapping end is secured to the end edge of the end 12 by means of bolts or rivets 13 and is then outwardly bowed as at 14 to form a pole socket. The edge of the overlapping end is secured to the other end 12 adjacent its end edge but spaced therefrom as by the bolts or rivets 15. The bowed portion is provided with alined openings 16 for the reception of a securing pin 17 for the pole 18. Furthermore this blank has inverted U-shaped slits cut therein forming upwardly extending tongues 19 which are struck out to constitute hooks. Extending upward from the blank is a series of spaced fingers 20 having rounded root portions and rounded tips as clearly seen from Fig. 1.

At 21 is a chute made of fabric or other suitable flexible material and the upper end of this chute is engaged over the lower end of the picking member or crown and carries rings 22 which engage on the hooks or tongues 19. Secured along this chute 21 are pairs of tie straps 23 which are so arranged that they can be brought around the pole and there tied for the purpose of securing the lower part of the chute to the pole.

In using the device the parts are assembled by connecting the chute to the crown and placing the pole in position so that the pin may be passed through and hold the crown and pole together. The chute is then tied at a suitable point to the pole and the bottom of the chute held closed while the operator thrusts the crown up into position so that the fruit lies within the circle formed by the fingers. Then by moving to one side or the other the fruit is detached and dropped down through the chute. The operator may have a basket or other receptacle suspended at his waist and by opening the lower end of the chute the fruit will fall gently into the basket without bruising or injury. It will be obvious that by picking the fruit in this manner it is preserved in its proper state since the fruit is picked one at a time and is not harmed as is occasioned by shaking the tree or boughs. It will also be obvious that owing to the construction of the crown of a single blank the device may be very economically manufactured since it can be stamped out and bent to shape and since the fingers are so formed as to permit the stamping out with the minimum waste of material.

There has thus been provided a simple and efficient device of the kind described and for the purpose specified.

Having thus described the invention, what is claimed as new, is:—

1. A top member for fruit pickers consisting of a blank of sheet metal having a reduced end portion, a pole engaging socket formed from the reduced portion of the blank, means for securing one end of the blank to the other end of the blank to form a cylindrical member, means for securing the free edge of the pole receiving socket to the blank, and upwardly extending tongues struck out from the cylindrical portion of the blank to form hooks for the attachment of a chute, said blank further having upwardly directed fingers extending from its upper edge.

2. A top member for fruit pickers consisting of a blank of sheet metal, one end of which is reduced, means for securing the other end of the blank to the body portion thereof at the base of the reduced portion to provide a cylindrical member, a pole receiving socket formed from the reduced portion of the blank and securing its free edge to the body portion of the cylindrical member, upwardly extending tongues struck out from the blank to form a chute attaching means, and upwardly projecting fingers formed on the upper edge of the flat portion of the blank to form a cylindrical member.

3. A top member for fruit pickers consisting of a blank of sheet metal bent into substantially cylindrical form with one end overlapping the other, the overlapping end being secured to the end edge of the other end and outwardly bowed to form a pole socket, the edge of the overlapping end being secured in spaced relation to the opposite end, said blank having upwardly extending tongues struck out from the blank and forming hooks for the attachment of a chute, said blank further having upwardly directed fingers extending from its upper edge.

In testimony whereof, I affix my signature, in the presence of two witnesses.

FRED J. SLENKER.

Witnesses:
JAMES REILLY,
RALPH GUSSWEIN.

Copies of this patent may be obtained for five cents each, by addressing the "Commissioner of Patents, Washington, D. C."